United States Patent [19]
Bateman

[11] 3,958,218
[45] May 18, 1976

[54] AIRCRAFT GROUND PROXIMITY WARNING SYSTEM WITH SPEED COMPENSATION

[75] Inventor: Charles Donald Bateman, Bellevue, Wash.

[73] Assignee: Sundstrand Data Control, Inc., Redmond, Wash.

[22] Filed: Aug. 20, 1975

[21] Appl. No.: 606,037

Related U.S. Application Data

[63] Continuation of Ser. No. 511,674, Oct. 3, 1974, abandoned.

[52] U.S. Cl. ............................ 340/27 R; 73/178 R; 235/150.2; 244/182; 343/7 TA; 343/112 A; 343/112 CA
[51] Int. Cl.² ........................................ G01C 5/00
[58] Field of Search .................. 73/178 R, 178 T; 179/15 A; 235/150.2, 150.22; 244/77 A, 77 D; 318/583, 584; 340/16 R, 16 M, 16 C, 27, 29, 52 H, 56, 62, 66, 74, 258; 343/5 LS, 7 R, 7 TA, 7 ED, 7 PF, 7.7, 8, 9, 12 R, 12 A, 108 R, 112 A, 112 CA, 112 S

[56] References Cited
UNITED STATES PATENTS

| | | | |
|---|---|---|---|
| 2,702,342 | 2/1955 | Korman.................. | 343/112 CA X |
| 2,735,081 | 2/1956 | Hosford................... | 340/27 R |
| 2,736,878 | 2/1956 | Boyle, Jr. ................ | 340/27 R |
| 2,851,120 | 9/1958 | Fogiel..................... | 340/112 CA X |
| 2,930,035 | 3/1960 | Altekruse................ | 343/7 TA |
| 2,931,221 | 4/1960 | Rusk....................... | 73/179 |
| 3,077,557 | 2/1963 | Joline et al. ............ | 244/77 D X |
| 3,093,807 | 6/1963 | Crane et al. ........... | 340/1 R |
| 3,140,483 | 7/1964 | Sikora et al. ........... | 343/7 TA |
| 3,210,760 | 10/1965 | Olson et al. ........... | 343/7 TA |
| 3,245,076 | 4/1966 | Le Tilly et al. ......... | 343/7 TA |
| 3,248,728 | 4/1966 | Garfield et al. ........ | 343/5 LS |
| 3,510,090 | 5/1970 | Falkner et al. ........ | 244/77 D |
| 3,743,221 | 7/1973 | Lykken et al. ......... | 244/77 A |
| 3,766,518 | 10/1973 | Rilett..................... | 343/7 TA X |
| 3,774,017 | 11/1973 | Zagalsky................ | 235/150.2 |

OTHER PUBLICATIONS
Brantley, James Q., "Radar Offers Solution to Midair Collisions," *Electronics*, Nov. 1954, pp. 146–150.

*Primary Examiner*—Stephen G. Kunin
*Attorney, Agent, or Firm*—Ted E. Killingsworth; Michael B. McMurry

[57] ABSTRACT

By using air speed as an input to a ground proximity warning system that includes: a signal representative of the time rate of change of the aircraft altitude with respect to ground; circuitry for limiting the amplitude of this signal; a signal that represents a time rate of change of the aircraft's barometric altitude; and circuitry for combining the amplitude limited signal, representing the time rate of change of the aircraft with respect to ground, with a signal that represents the aircraft's altitude over ground; the effective warning time is extended by increasing the allowable amplitude, of the signal representing rate of change of the aircraft with respect to the ground, in response to the speed of the aircraft.

7 Claims, 5 Drawing Figures

3,958,218

AIRCRAFT GROUND PROXIMITY WARNING SYSTEM WITH SPEED COMPENSATION

CROSS-REFERENCE TO RELATED APPLICATIONS

This application is a continuation of the copending application Ser. No. 511,674 filed Oct. 3, 1974, entitled "Aircraft Ground Proximity Warning System with Speed Compensation" now abandoned.

BACKGROUND OF THE INVENTION

The invention relates to the field of aircraft ground proximity warning systems and in particular to a system that provides increased warning time with increased aircraft speed.

In the prior art ground proximity warning systems, as represented by Astengo U.S. Pat. No. 3,715,718 and the application of Bateman Ser. No. 480,727, the effective warning time is significantly reduced as the speed of the aircraft increases. Normally this is not a problem because aircraft, when flying at relatively higher speeds, are usually at a greater altitude and thus, there is usually little need for a ground proximity warning system. However, there are certain limited circumstances in which an aircraft operating at higher speeds might have use for a ground proximity warning system, such as an aircraft flying through mountainous territory. Since most ground proximity warning systems are designed for use in situations where the aircraft is landing or taking off at relatively slower speeds, it is desirable to make adjustments to compensate for those unusual circumstances indicated above.

SUMMARY OF THE INVENTION

It is accordingly an object of the present invention to provide a speed compensating addition to a ground proximity warning system that will permit extended warning times at higher speed.

It is a further object of the invention to provide a means of automatically adjusting the limits on the amplitude of a signal representing the rate of change of the aircraft with respect to the ground so as to compensate for increased speed.

In the prior art, specifically represented by Astengo U.S. Pat. No. 3,715,718, the amplitude of the signal, which represented the rate of change of the aircraft with respect to the ground, was limited to one predetermined value when the aircraft was flying in a "flaps-up condition." Here the amplitude limited signal is combined with a signal that represented the rate of change in the barometric altitude. In the prior art systems these two signals are combined along with information concerning the aircraft's characteristics and configuration, and this result is compared to the aircraft's actual altitude over ground to determine as to whether a warning signal should be activated.

However, as an aircraft increases its air speed, the effective warning time, which is the time between when the alarm is activated and when the aircraft would impact the ground, drops in a rough proportion to the increase in the aircraft speed. In order to provide a longer warning time at higher speeds, the amplitude limitation on the signal that indicates the rate of change of the aircraft with respect to ground, is increased at a rate proportional to the increase in speed of the aircraft. Since the increase in amplitude of this signal will allow a stronger indication of the relative approach of the ground at higher speeds the warning system will activate the alarm significantly sooner, and thus give the pilot greater warning time.

DETAILED DESCRIPTION OF THE INVENTION

Figure 1:
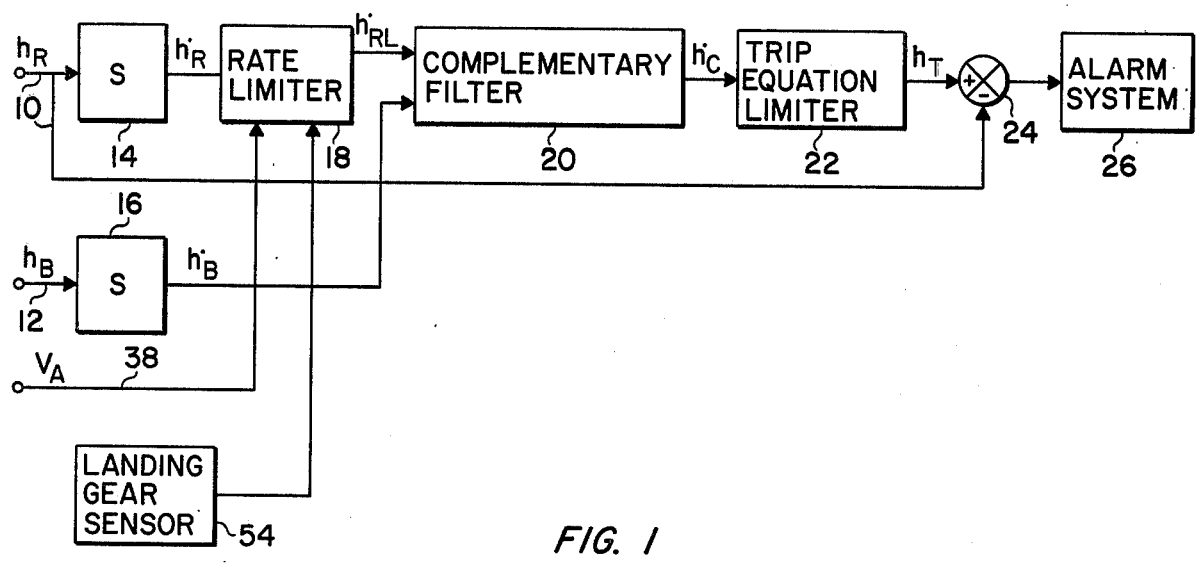
FIG. 1 is a block diagram of a ground proximity warning system incorporating the principles of the invention.

An overall block diagram of the aircraft ground proximity warning system is provided in FIG. 1 of the drawings. This circuit responds to two basic inputs which are: a measure of the aircraft's altitude above ground $h_R$ illustrated at 10 of FIG. 1, and a measure of the aircraft's barometric altitude $h_B$ input at 12 of FIG. 1. Each of these signals is differentiated by rate circuits 14 and 16, respectively. The output of the rate circuit 14 is a signal that represents the rate of change of the altitude of the aircraft with respect to ground $\dot{h}_R$, which in turn is used as an input to the rate limiter circuit 18. The function of rate limiter circuit 18 is to limit the amplitude of the $\dot{h}_R$ signal to a predefined limit, thus producing an amplitude limited signal $\dot{h}_{RL}$. The output $\dot{h}_{RL}$ of the rate limiter 18 is then utilized as an input to a complementary filter 20 along with signal $\dot{h}_B$. A complementary filter then combines the signals into a combined altitude rate signal $\dot{h}_C$ that is used as input to a trip equation computer 22. A computer 22 generates signal $h_T$ which is representative of the trip altitude for the particular altitude rate of change of the aircraft. This calculated trip altitude signal is then compared with the altitude of aircraft with respect to ground signal $h_R$ to determine whether a warning should be given. Specifically, the altitude signal $h_R$ on line 10 is subtracted from trip altitude signal $h_T$ at a summing junction 24, and whenever the ouput of the summing junction 24 is positive, a alarm system 26 will be triggered. A warning system using components as described above is disclosed in detail in Astengo U.S. Pat. No. 3,715,718.

It can be appreciated, then, that the amount of warning time provided is dependent upon the amplitude limitations on the signal $\dot{h}_R$ placed by the rate limiter 18. An illustration of this effect is provided by FIG. 2, which is a plot of warning times versus aircraft speed, assuming the aircraft is in level flight approaching an exemplary mountain. The lower portion of the plot 30 demonstrates an increasing warning time for an increasing rate of aircraft speed. The dashed line illustrates the response of the prior art warning system. Here it is apparent that as the aircraft increases speed the effective warning time is reduced. The upper plot, solid line 34, indicates a more desirable warning time characteristic which is an object of this invention.

Figure 3:
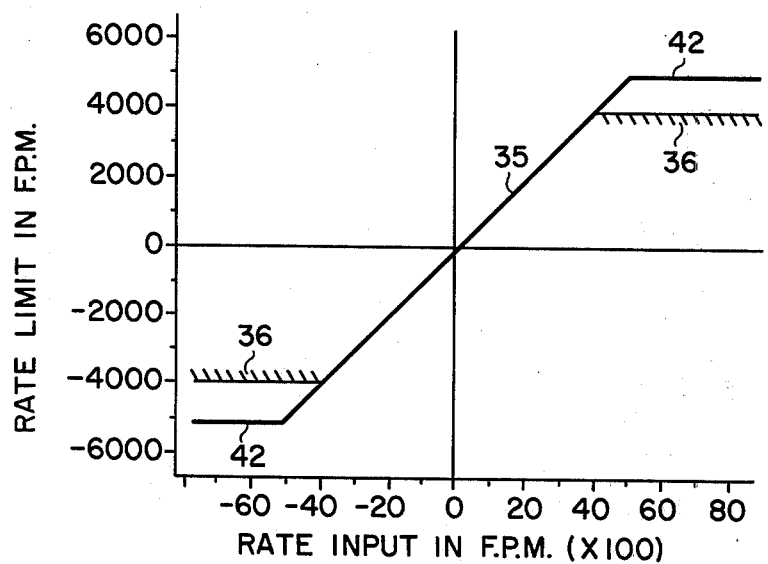
FIG. 3 is a graph illustrating the response of the rate limit circuitry to a signal that represents the rate of change of aircraft with respect to the ground.

The increased warning time is accomplished by increasing the allowed amplitude permitted by the rate limiter 18 as a function of the aircraft speed. In FIG. 3 of the drawings, line 35 in combination with dashed lines 36, represents the output characteristics of the rate limiter 18 of FIG. 1 without an air speed correction. The amplitude limits are shown by the dashed lines 36, which place an effective limit of approximately 3,900 FPM on the output of the rate limiter.

Figure 4:
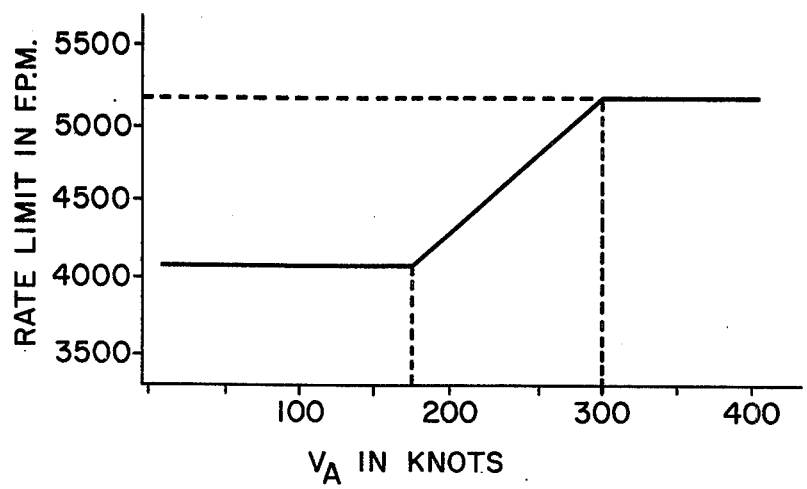
FIG. 4 is a graph illustrating the amplitude limitations of the rate circuitry with respect to the air speed of the aircraft.

By utilizing as an input a signal representing air speed as shown at 38 of FIG. 1 to the rate limiter 18 the characteristic illustrated by lines 42 in FIG. 3 are achieved. This particular point is illustrated in FIG. 4 where the effective rate limit is increased from approximately 3,900 FPM for a speed of approximately 178 knots to approximately 5,100 FPM at a speed of 300 knots. The net result of allowing the rate limit to increase as shown in FIG. 4 will be the warning time characteristic 34 shown in FIG. 2.

At this point it is appropriate to point out that the various numerical values for speeds and rates of altitude change are provided for illustrative purposes and in no way are intended to limit the scope of the invention. For example, it is being assumed for purposes of this disclosure that the aircraft has a maximum speed of approximately 300 knots so that the warning curve shown in FIG. 2 would be adequate to give over 20 seconds warning above an aircraft speed of 178 knots. By the same token, the output characteristics of the rate limiter 18 as are shown in FIG. 3, for purposes of clarity, as being linear but are in reality somewhat non-linear.

Figure 5:
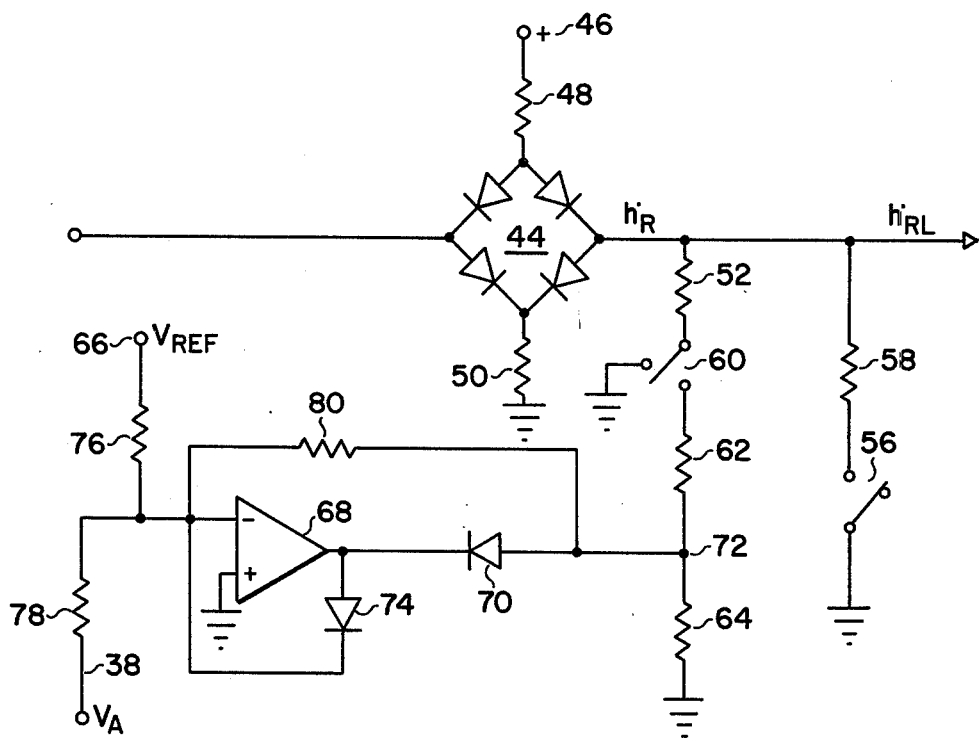
FIG. 5 is a schematic diagram of a circuit for varying the altitude rate limit as a function of air speed.

Circuitry for accomplishing an increase in the rate limitation of the rate limiter 18 of FIG. 1 is shown in FIG. 5. The object of this circuit is to increase the amplitude of the signal $h_R$ as the speed of the aircraft increases as measured by the signal $V_A$. The particular circuit shown in FIG. 5 is designed to operate in conjunction with the rate limiter circuit shown in Astengo U.S. Pat. No. 3,715,718. The voltage relationship established in a bridge 44, a voltage source 46 and resistors 48, 50 and 52 establish a level at which the altitude rate signal $h_R$ is limited by effectively limiting the current output of the bridge 44. When the aircraft is in a landing configuration a landing gear sensor 54 of FIG. 1 generates a signal which closes the switch 56 which serves to place resistor 58 in parallel with resistor 52, thereby decreasing the permitted amplitude of the $h_R$ signal. However, when the aircraft is in level flight a switch 56 will be opened and a switch 60 will be closed, placing resistors 62 and 64 in series with resistor 52. Since, in the preferred embodiment, resistor 62 and 64 are small in comparison with resistor 52, the circuitry will react as in the prior art system by limiting the $h_R$ signal as shown by line 36 in FIG. 3.

As the aircraft increases speed, the $V_A$ signal 38 will increase until it exceeds a reference voltage 66, both of which are used as input to a negative input terminal of an operational amplifier 68. As the $V_A$ voltage increases beyond the reference voltage 66, the amplifier 68 begins to conduct, thereby causing current to flow through a diode 70 from a junction 72. As the current flow through diode 70 increases with the increasing $V_A$, the relative voltage level at junction 72 will drop, thereby causing an increased current flow through the bridge 44. This will in effect increase the allowable amplitude of the $h_R$ signal as the speed of the aircraft increases. A diode 74 has the function of blocking the positive voltage on line 38 from the output of the amplifier 68. A bias resistor 76 and an input resistor 78 are used to provide the correct voltage level for input to the amplifier 68, and resistor 80 is used to scale the feedback signal for the amplifier 68.

Figure 2:
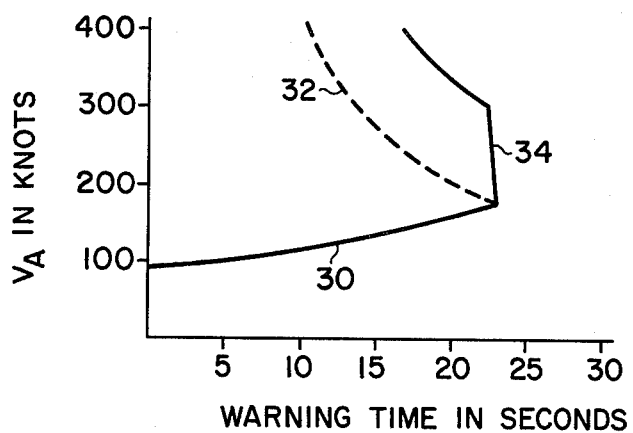
FIG. 2 is a graph illustrating the speed of an aircraft versus warning time.

The effect of the circuitry in FIG. 5 will be to substantially produce the rate limiter characteristic shown by lines 44 in FIG. 3, thus producing the warning time versus speed results shown by line 34 in FIG. 2.

I claim:
1. In an aircraft ground proximity warning system having: first signal means for generating a signal representative of the time rate of change of the aircraft with respect to the ground; limit means for limiting the amplitude of said first signal means; scond signal means for generating a signal representing the time rate of change of the aircraft's barometric altitude; filter means for combining the long-term output of said limit means with a short-term output of said second signal means; and warning signal means for combining the output of said filter means with a signal representative of the aircraft's altitude over ground; wherein the improvement comprises:
means for varying the limits of said limit means with respect to the aircraft's speed, thereby providing increased warning time at greater aircraft speeds.

2. The warning system of claim 1 wherein said means for varying the limits includes means for varying the amplitude of the output signal of said limit means as a function of a signal representing the aircraft's speed.

3. The warning system of claim 2 wherein said means for varying the limits includes amplifier means responsive to said aircraft's speed signal for permitting increased amplitude output from said limit means.

4. An aircraft ground proximity warning system comprising:
means for generating a signal representing the aircraft's altitude above the ground;
means for generating a signal representing the time rate of change of the aircraft with respect to the ground;
combining means for combining said aircraft altitude signal with said time rate of change signal to generate a combined signal;
warning means, responsive to said combined signal, for generating a warning signal when said combined signal exceeds a predefined reference value; and
speed compensating means, operatively connected to said combining means and responsive to a signal representing the aircraft's longitudinal velocity for effectively varying said reference value required to generate said warning signal as a function of aircraft longitudinal velocity in order to increase warning times at greater aircraft longitudinal velocities.

5. The warning system of claim 4 wherein said means for generating a signal representing the aircraft's altitude is derived from a radar altimeter.

6. The warning system of claim 5 wherein said means for generating a signal representing the time rate of change of the aircraft with respect to ground includes means for differentiating said signal representing the aircraft's altitude.

7. The warning system of claim 6 additionally including means for limiting the amplitude of said signal representing the time rate of change of the aircraft's altitude; and wherein said speed compensating means includes means for increasing said amplitude limits as a function of aircraft speed.

* * * * *